United States Patent
Brandwine et al.

(10) Patent No.: US 9,729,524 B1
(45) Date of Patent: Aug. 8, 2017

(54) AUTHENTICATED DEVICE-BASED STORAGE OPERATIONS

(71) Applicant: Amazon Technologies, Inc., Reno, NV (US)

(72) Inventors: Eric Jason Brandwine, Haymarket, VA (US); Gregory Branchek Roth, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/569,038

(22) Filed: Dec. 12, 2014

(51) Int. Cl.
  *G06F 21/00* (2013.01)
  *H04L 29/06* (2006.01)
  *H04L 9/32* (2006.01)

(52) U.S. Cl.
  CPC ........ *H04L 63/0457* (2013.01); *H04L 9/3247* (2013.01)

(58) Field of Classification Search
  CPC .......................... H04L 9/3247; H04L 63/0428
  See application file for complete search history.

(56) References Cited

U.S. PATENT DOCUMENTS

2004/0255123 A1* 12/2004 Noyama .......... G11B 20/00086
  713/176
2012/0233668 A1* 9/2012 Leafe .................... G06F 9/5022
  726/4

* cited by examiner

*Primary Examiner* — Alexander Lagor
(74) *Attorney, Agent, or Firm* — Hogan Lovells US LLP

(57) ABSTRACT

Data storage operation commands are digitally signed to enhance data security in a distributed system. A data storage client and a compute-enabled data storage device may share access to a cryptographic key. The data storage client uses the cryptographic key to digitally sign commands transmitted to the data storage device, which can use its copy to verify a digital signature of a command before fulfilling the command. The storage device can also determine whether to perform a transformation, such that requests authenticated to a first identity might receive cleartext while a request authenticated to a second identity might receive ciphertext. The compute-enabled storage device can also receive unauthenticated calls and attempt to retrieve the appropriate key from a key management service or other such source.

20 Claims, 12 Drawing Sheets

AUTHENTICATED DEVICE-BASED STORAGE OPERATIONS

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Many techniques have been developed to enhance data security. Utilization of these techniques, however, often requires the use of additional computing resources, such as processing and memory capacity. Use of the extra resources often adds latency to electronic request fulfillment due to the performance of operations, such as encryption operations, that are performed. While the additional latency and resource usage can be acceptable for many contexts, in other contexts low latency is of high importance. Conventional techniques for providing data security often require an unacceptable tradeoff between latency and security.

BRIEF DESCRIPTION OF THE DRAWINGS

Various embodiments in accordance with the present disclosure will be described with reference to the drawings, in which.

DETAILED DESCRIPTION

Figure 1:
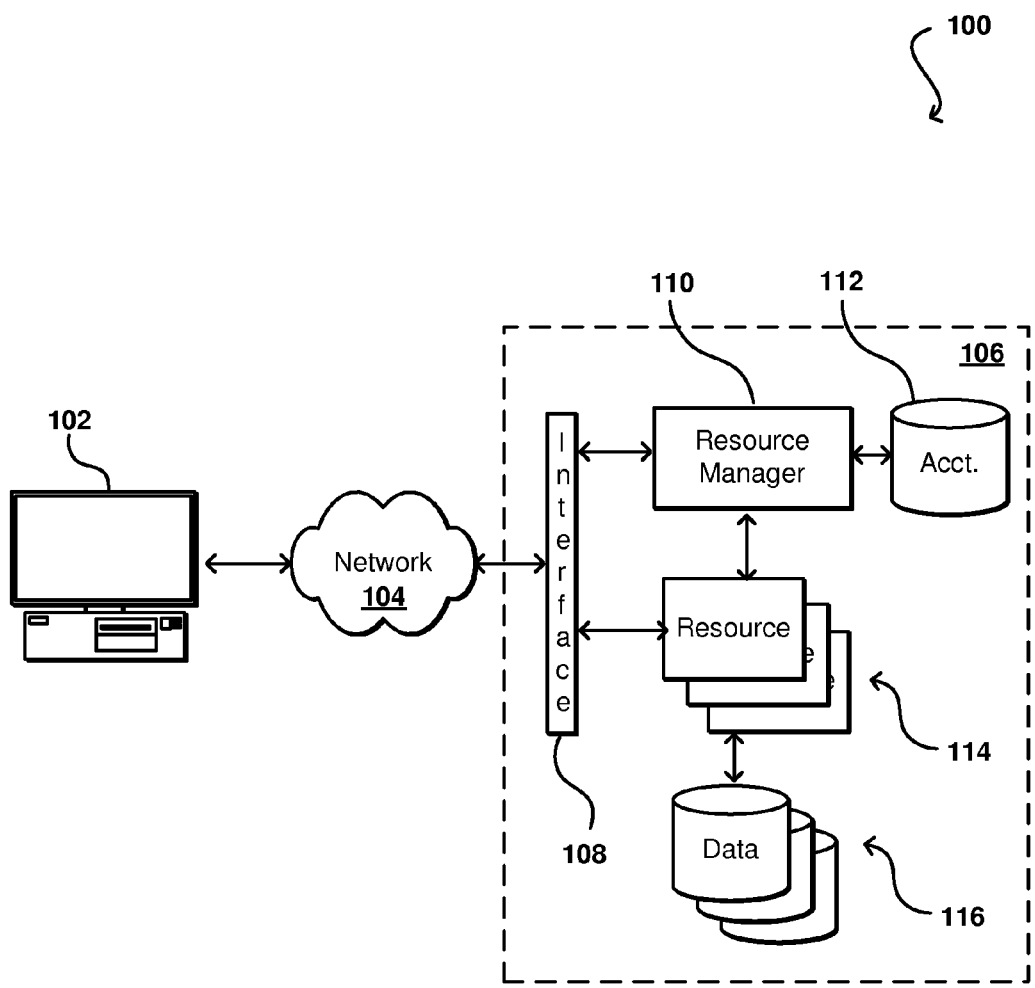
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the authentication of data storage operation commands, as may be utilized in a distributed system. In various examples, a data storage service provides a frontend subsystem that receives application programming interface (API) calls or other requests whose fulfillment involves the performance of data storage operations. To fulfill the data storage operations, the frontend subsystem may transmit data storage operation commands, such as input/output commands, to a backend system or component that performs the commanded data storage operations. In some embodiments, the data storage operation commands are sent synchronously relative to the API calls that caused the commands to be transmitted while in other embodiments, the data storage operations commands are sent asynchronously relative to the API calls that cause the commands to be transmitted and in yet other embodiments, some data storage operation commands are sent synchronously while others are sent asynchronously. In the case of asynchronously sent data storage operation commands, the commands may take the form of logs (i.e., commands to process logs) of operations that were performed by the frontend system and that are to be persisted in the backend system. In this manner, the frontend system is able to process API calls with low latency.

To enhance data security, data storage operation commands are digitally signed by the frontend subsystem for verification by the backend subsystem. In some examples, the backend subsystem comprises a backend module or component on one or more compute-enabled storage devices. Each compute-enabled storage device includes processing capability enabling the device to perform tasks such as to authenticate commands. Data storage operation commands may be transmitted from the frontend subsystem to the backend subsystem over a network connection, a dedicated storage bus, or other mechanism for data transmission. For example, an input/output command may be a write command that specifies an address to which to write data. The data may be sufficiently large that multiple packets are required for the transmission of the command. In this example, a single digital signature may be applied to an input/output command whose complete transmission is accomplished by multiple transmissions, each with a portion of the input/output command. The individual packets may or may not be additionally signed, in various embodiments. In other words, a single digitally signed storage operation command may be broken up over multiple transmissions. The address specified in the data storage operation command may specify a device-level address of data to be operated upon (e.g., read, written, or transformed) such as a physical or logical block address or physical or logical offset. The compute-enabled storage device can be configured to determine that a digital signature of the data storage operation command is valid before performing the commanded data storage operation, which can be received from a platform, guest, or other such source. The compute-enabled storage device also can be configured to perform a transformation where appropriate, such that a request authenticated for a first identity might receive data in a first format, such as cleartext or plaintext, and a request authenticated to a second identity might receive data in a third format, such as ciphertext. A request or call that is authenticated to a third party, or unauthenticated, might not receive any data at all or the request can be otherwise denied.

In some embodiments, a compute-enabled storage device can receive an authenticated call from a guest or platform, or other command initiator, where that call includes a data storage command. The device can then attempt to use forward access to fetch the key requisite to decrypt the data. The device can authenticate the guest and determine any criteria needed for the requested data storage operation to be performed on behalf of that guest. The compute-enabled storage device can make a call to a key management system or other such component, where the device may be acting on behalf of a guest corresponding to a customer and the call is signed (contains a signature). The key system can then make a decision as to whether to issue that key. If the key is received by the storage device, the device can determine whether, and how, to process the data storage command.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
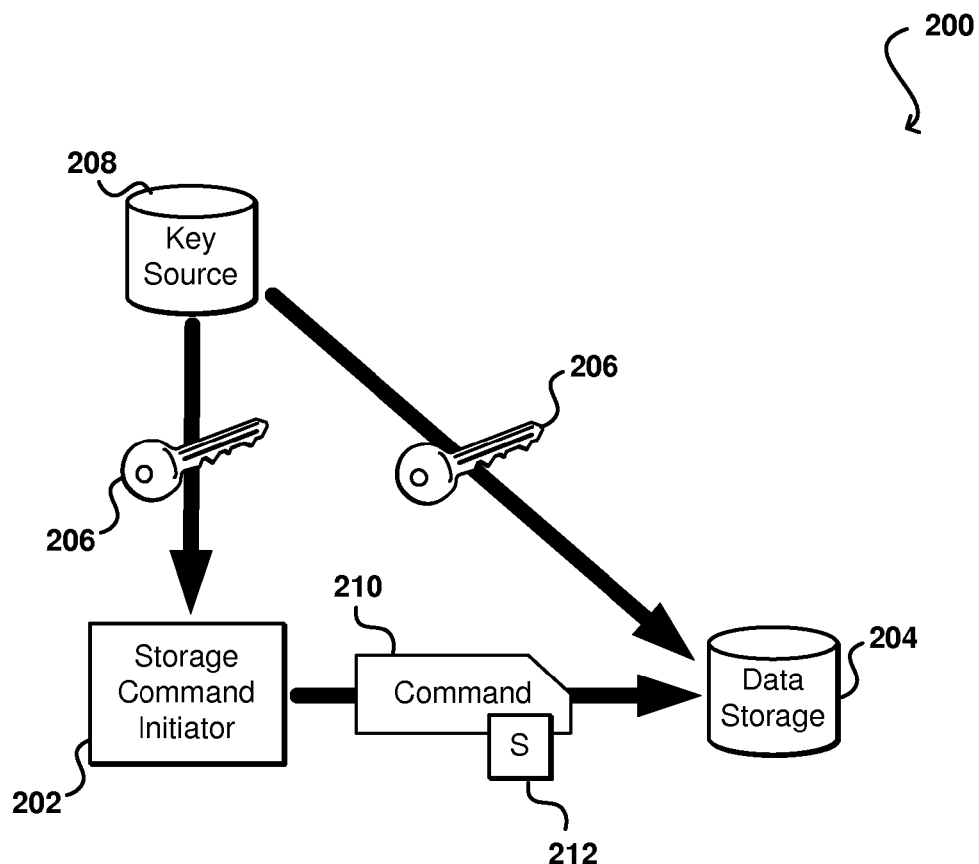
FIG. 2 shows an example of an environment in which digitally signed requests can be processed in accordance with various embodiments.

FIG. 2 shows an illustrative example of an environment 200 in which various embodiments can be implemented. This example environment 100 includes a storage command initiator 202 and data storage 204, which can include one or more data storage devices. The storage command initiator 202 may be implemented in various ways in accordance with various embodiments. For example, in some embodiments, the storage command initiator is a computer system that processes database queries that were submitted in the form of API calls. In specific embodiments, the storage command initiator can be a process executing in a guest in a hypervisor provided in a multi-tenant environment by a multi-tenant service provider. The storage command initiator can issue storage operation commands to be performed by another system, service, or component such as described in more detail below. These commands can be issued over a storage bus, for example, such as may utilize an embedded storage protocol. Generally, the data storage 204 is enabled to perform various operations, on the one or more data storage devices, in response to storage operations commands 210, where the operations generally relate to the persistent storage of data. In some embodiments the data storage system is a backend system of a database system that may be operated as part of a database service. The backend system can include one or more hard drives with spinning magnetic media and/or solid state media, and generally devices and systems of multiple devices that persistently store data. While devices that persistently store data are used throughout for the purpose of illustration, the techniques described herein are useable in connection with other data storage systems that do not necessarily persistently store data such as data storage systems that maintain data in volatile memory without persistently storing the data.

As illustrated in the example of FIG. 1, both the storage command initiator 202 and the data storage system 204 have access to instances of the same cryptographic key 206. The cryptographic key 206 may be, for example, a symmetric or asymmetric cryptographic key useful for the performance of various cryptographic algorithms. Examples of cryptographic algorithms include those discussed above and encryption/decryption algorithms, such as may include modes of the advanced encryption standard (AES), the data encryption standard (DES), triple DES (3DES), Serpent, Twofish, blowfish, CAST5, RC4 and the international data encryption algorithm (IDEA), among others. In an embodiment, the storage command initiator 202 and data storage 204 each receive a copy of the cryptographic key 206 from a key source 208. The key source 108 may be a system that manages keys on behalf of one or more entities. For example, the key source may be a computer system that securely stores cryptographic keys, providing copies of the cryptographic keys only to entities authorized to receive such copies. As discussed in more detail below, the key source 208 may itself receive cryptographic keys from another key source. As keys are passed from one entity to another, the keys may be scoped using techniques discussed herein so that a first system with access to a first key uses the first key to derive a second key that is passed onto a second system.

In some embodiments, receipt of a cryptographic key associated with a customer of the provider configures the storage command initiator 202 with an association of the customer with the cryptographic key. As a result of the association, the storage command initiator 202 has the ability to, when a request is received on behalf of the customer, digitally sign storage commands using the cryptographic key. The cryptographic key can be usable by the storage command initiator 202 to verify requests submitted by, or on behalf of, the customer prior to digitally signing storage commands as part of fulfillment of the requests. In some other embodiments, the key source 208 may be an authentication subsystem of a computing resource service provider. In some embodiments, the storage command initiator 202 receives digitally signed requests (e.g., in the context of a customer/provider relationship, from customers of the provider and/or from other systems operating on behalf of the customers, which may be subsystems of the provider) and transmits the digitally signed requests to the key source 208 for verification. When presented with a digital signature of at least a portion of a request, which serves as a form of proof of the pending request, the key source 208 may verify the digital signature and, on a condition that the digital signature is verified, communicate to the storage command initiator 202 that the request is verified. It should be noted that the storage command initiator 202, in some embodiments, may be able to exhibit proof of a pending customer request without having received the request from the customer itself. Such may be the case, for example, in embodiments where the request is generated and transmitted by an entity different from the customer but on behalf of, and with authorization from, the customer, such as from another service, system, or device of the provider or from a third-party computer system operating on behalf of the customer.

To verify the digital signature, the key source 208 may access a cryptographic key from memory and provide a cryptographic key to the storage command initiator to digitally sign one or more storage commands 210 to be transmitted to data storage 204. The cryptographic key provided to the storage command initiator 202 may be the same cryptographic key that was accessed by the key source 208 or a different cryptographic key derived therefrom (e.g., using techniques described elsewhere herein). In this manner, the storage command initiator 202 has access to a cryptographic key for signing one or more storage commands as a result of an association of the cryptographic key that was provided with the customer, the association being formed through an association of the customer with another cryptographic key from which the provided cryptographic key was derived.

As noted above, the storage command initiator 202 can issue various storage operation commands to data storage 204. Such data storage commands may be configured to cause the data storage system to perform one or more operations specified by the storage operation command. In an embodiment, the storage command initiator 202 digitally signs storage operations commands for verification by data storage 204. As illustrated in FIG. 2, for example, the storage command initiator 202 transmits a storage operation command 210 to data storage 204 along with a digital signature 212 on at least a portion of the command, such as in the case of a symmetric message authentication code (MAC). In this manner, as discussed in more detail below, the data storage system 204 can verify the digital signature 212 to determine whether to fulfill the storage operation command 210 from the storage command initiator 202. Further, unauthorized transmission of commands to the data storage system may be ineffective in corrupting or otherwise manipulating data stored by the data storage system 104.

The data storage command 210 may be configured in accordance with a data storage command protocol, which may be a structured query language (SQL) command, a binary input/output (I/O) protocol, a block-level storage operation command or otherwise. Other examples include the small computer system interface (SCSI) and serial ATA. Variations of such protocols may also be used, such as Internet SCSI (iSCSI) and SCSI over Fiber Channel. The data storage command may be transmitted over another protocol, such as by encoding the command in a data packet transmitted over a network. For example, the command may be encoded in a TCP/IP packet or Fiber Channel (FC) packet. While examples of specific protocols are provided for the purpose of illustration, the techniques described herein are extendible to other protocols including, but not limited to, proprietary protocols. Further, such a binary I/O protocol used with the techniques described herein may include the ability to encode policy (to be enforced by a signature verifying entity, e.g.), bearer tokens, cookies, cryptographic key identifiers, and/or other metadata. Generally, a storage operation command (also referred to as a data storage operation command) may be any digital encoding of a command and associated metadata that is receivable by a data storage system to cause the data storage system to fulfill the command (in accordance with the metadata, if applicable). Further, storage operation commands may be transmitted in plaintext (i.e., unencrypted) for to avoid latency caused by the need to perform encryption/decryption operations.

The storage command initiator 202 may generate the digital signature 212 based at least in part on the cryptographic key 206. In some examples, the storage operations command 210, or a portion thereof, is input along with the cryptographic key 206 into a one way function. For example, in one embodiment the digital signature 212 is computed as, or otherwise based at least in part on, a hash-based message authentication code of the cryptographic key 206 and the storage operation command 210. In another example, a one way function may be used to derive, from the cryptographic key 206, another cryptographic key which is used to generate the digital signature 212 based at least in part on the storage operation command 210. Example methods for deriving keys are discussed above and in more detail below. When data storage 204 receives a storage operation command 210 from the storage command initiator 202, the data storage may verify the digital signature 212 provided with the storage operation command 210. The digital signature 212 may be verified by the data storage 204 in various ways in accordance with various embodiments. For example, the data storage 204 may use its copy of the cryptographic key 206 to generate a reference digital signature in the same manner by which the storage command initiator 202 generated the digital signature 212 that was provided with the storage operation command 210. If the reference signature matches the digital signature 212, the data storage system may operate in accordance with the digital signature 212 being verified. As another example, data storage 204 may derive the same key that was derived by the storage command initiator 202 and use the derived key to generate a reference signature which is compared to the digital signature 212. In this manner, storage operation commands for which a digital signature is required may be fulfilled by the data storage system only when provided a valid digital signature which ensures that only systems with access to a suitable cryptographic key can cause some or all updates to the data storage.

In at least some embodiments, the data storage can comprise at least one data storage device, such as a solid state drive (SSD) or Serial ATA (SATA) drive, that has processing or "computing" capacity onboard that enables the device to perform actions such as may involve the authenticating of commands. These commands might be associated with various systems, devices, components, or entities, such as software guide extensions (SGX) enclaves, hypervisor guests, or customers of a provider, among others. Such a "compute-enabled" storage device can receive a digitally signed storage operation command, for example, and authenticate the command using the appropriate key stored in the device.

In conventional data encryption approaches, a key is sealed to the trusted code (i.e., to a trusted data enclave) and the storage system is unaware of the key, as a request indicates to store encrypted text at a particular offset, for example, and later provide that encrypted data back in response to a subsequent request. The storage device does not have access to the cleartext (or plaintext) associated with the encrypted data, and thus cannot perform various processing tasks related to the data. If the storage device is compute-enabled, and is able to obtain the cleartext instead of just the ciphertext from the encrypted data, the storage device can perform various additional processing tasks, such as to append the data to an existing list, increment a particular value, or otherwise semantically interpret the storage command. In order to be able to access the cleartext from the encrypted data, however, the compute-enabled storage device needs to have access to the key that was used to encrypt the data. A request (e.g., a SATA call or SCSI call) received to the storage device can have appended, or prepended, authentication information that includes at least some identification data. The compute-enabled storage device can process data for the request, as may involve various mathematical and string manipulation tasks, and determine whether the source claiming to be executing the command is actually the party executing the command. If so, another determination can be made as to whether that party, once authenticated, is also authorized or permitted to execute the command. If so, the compute-enabled storage device can execute the command as appropriate.

Figure 3:
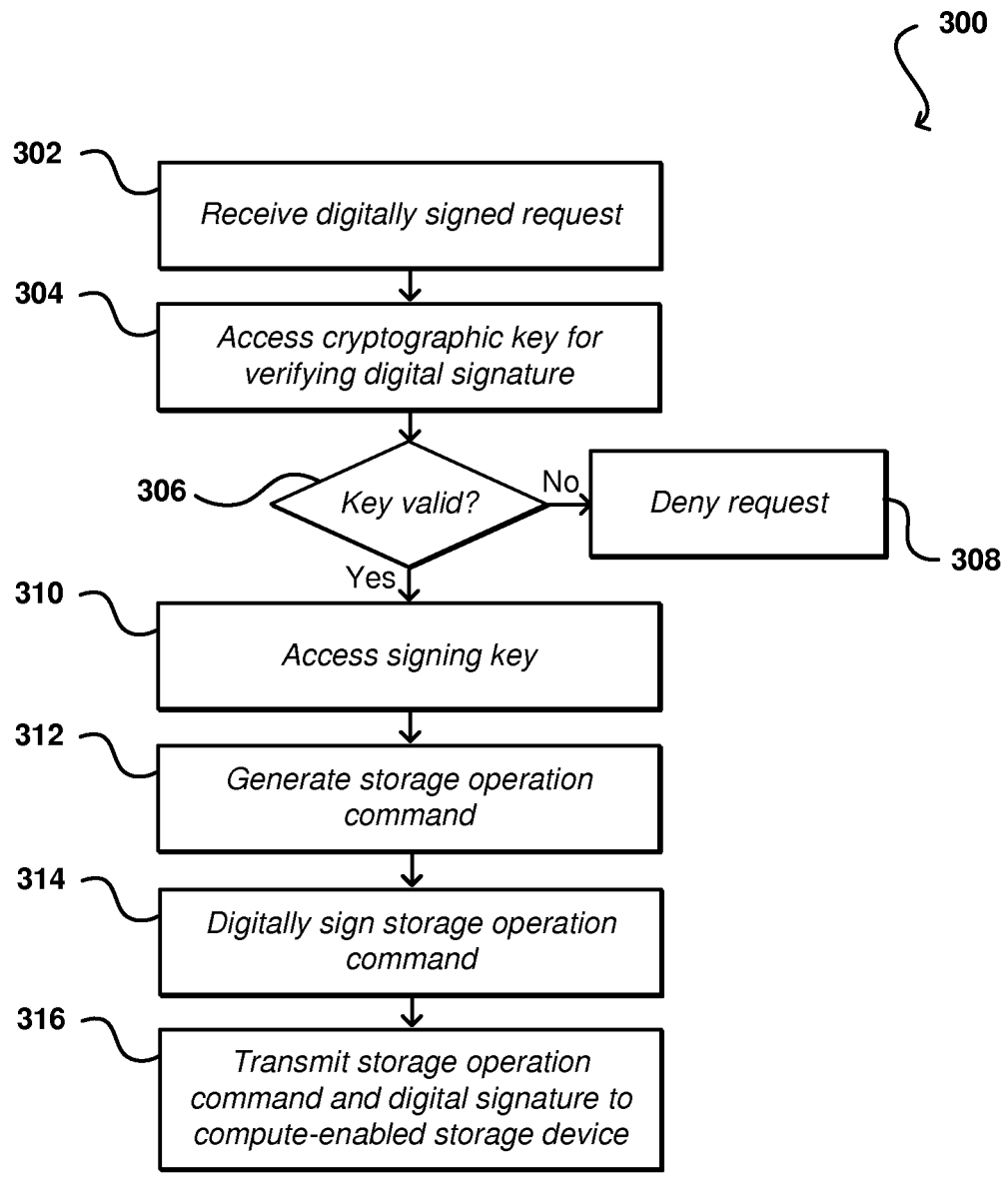
FIG. 3 illustrates an example process for transmitting a storage operation command that can be utilized in accordance with various embodiments.

FIG. 3 shows an example process 300 for transmitting storage operation commands for received requests that can be utilized in accordance with various embodiments. The process 300 may be performed by any suitable system such as by the storage command initiator 202 discussed above in connection with FIG. 2. In an embodiment, the process 300 includes receiving 302 a digitally signed request, such as an application programming interface (API) request. The request that is received may be formatted in various ways in accordance with various embodiments. For example, in some embodiments, the request is a web service request received over a network. The request may be transmitted in accordance with an application level protocol, such as the HyperText Transfer Protocol (HTTP). The request may be formatted such that fulfillment of the request involves the performance of at least one data storage operation and therefore transmission of a storage operation command such as described above. In this example, a cryptographic key can be accessed 304 for verifying a digital signature of the received request. Accessing the cryptographic key may be performed in various ways in accordance with various embodiments. For example, in some embodiments one or more features of the request are used to select a suitable cryptographic key from a plurality of cryptographic keys. An identity of an entity that submitted the request may be associated with the cryptographic key that is usable to verify digital signatures submitted by that identity. As another example, the request may include an identifier of a cryptographic key that enables selection of a suitable cryptographic key based in part on the identifier included in the request. Generally, any way by which a suitable cryptographic key usable for verifying the request is determinable may be used.

After accessing the cryptographic key, a determination can be made 306 as to whether the digital signature is valid. In some embodiments, the cryptographic key is a symmetric cryptographic key and determining whether the digital signature is valid may include generating a reference digital signature of the request (or portion thereof) and determining whether the reference signature matches the digital signature that was received with the request. If it is determined that the signature is not valid, the request may be denied 308. The request may be denied in various ways in accordance with various embodiments. For example, in some embodiments denying the request includes providing a response to the request that indicates that the request is denied and/or indicates one or more reasons for its denial. Other ways by which a request may be denied may involve performing no additional operations in connection with the request. Generally denying the request may include any suitable way of avoiding fulfillment of the request.

If, however, it is determined that the signature is valid, an appropriate signing key can be accessed 310. In one embodiment, a signing key is a cryptographic key usable to digitally sign a storage operation command to enable submission of the storage operation command along with the digital signature such that the digital signature can be successfully verified upon receipt and the storage operation command will, as a result, be fulfilled. The signing key that is accessed may vary in accordance with various embodiments. In some examples, the signing key is the same cryptographic key used to verify the digital signature of the request. In other examples, the signing key is a key derived (such as in accordance with various techniques described herein) based at least in part on the cryptographic key used for verifying the digital signature of the request. In yet another example, the signing key may be a cryptographic key from which the cryptographic key used for verifying the digital signature of the request is derived. In yet another example, neither the signing key nor the cryptographic key used for verifying the digital signature of the request is derived from the other. It should be noted that in embodiments where the cryptographic key used for verifying the digital signature of the request and the signing key are the same, the operation of accessing the signing key may have already been performed and thus may be considered to not be a separate operation.

Regardless of how the signing key is accessed, a storage operation command can be generated 312. In one embodiment, the storage operation command is a command to perform a data storage operation that matches the request that was received. For example, an application programming interface of a system through which API calls are submittable may have a variety of API calls that may be made to effect data storage operations. The various types of API calls that can be made may correspond to types of storage operation commands that are transmitted as part of fulfillment of the API calls. Further, generating a storage operation command may include populating a template for a command with data which may be data received in the request. As an illustrative example, if the request is an API request to store data, the storage operation command may include or otherwise specify the data to be stored that was included in the request. Once the storage operation command has been generated, the storage operation command can be digitally signed 314, which as discussed above may include using the accessed signing key to generate a digital signature based, at least in part, on the generated storage operation command. Once the storage operation command has been digitally signed, the storage operation command and the digital signature that was generated can be transmitted 316 to data storage, such as at least one compute-enabled storage device as discussed herein, where at least one compute-enabled storage device can be configured to verify the digital signature using its own copy of the signing key (which it may have to derive, in some embodiments) and, upon verification of the digital signature, fulfill the storage operation command.

In this process a storage command is transmitted as a result of a received API request being fulfilled. Storage commands may be transmitted in other ways as well. For example, in some embodiments a system that receives API requests is operable to fulfill the API requests by performing log operations where the log operations are transmitted at a later time to another system that processes a log in order to persistently store data in accordance with the operations that were performed. A system that receives API requests may, for instance, utilize in a memory copy of a database to provide low latency access to the database through, for example, appropriately configured database queries. Thus, the system may provide quick performance of fulfillment of API requests by utilizing the in-memory copy of the database. To maintain the persistently stored copy of the database, another system may maintain the copy of the database in persistent storage. The system with the in-memory copy of the database may transmit logs of the operations that were performed which may then be processed by the system with the persistently stored copy of the database in order to update the persistently stored copy of the database asynchronously with the API requests that were received.

Figure 4:
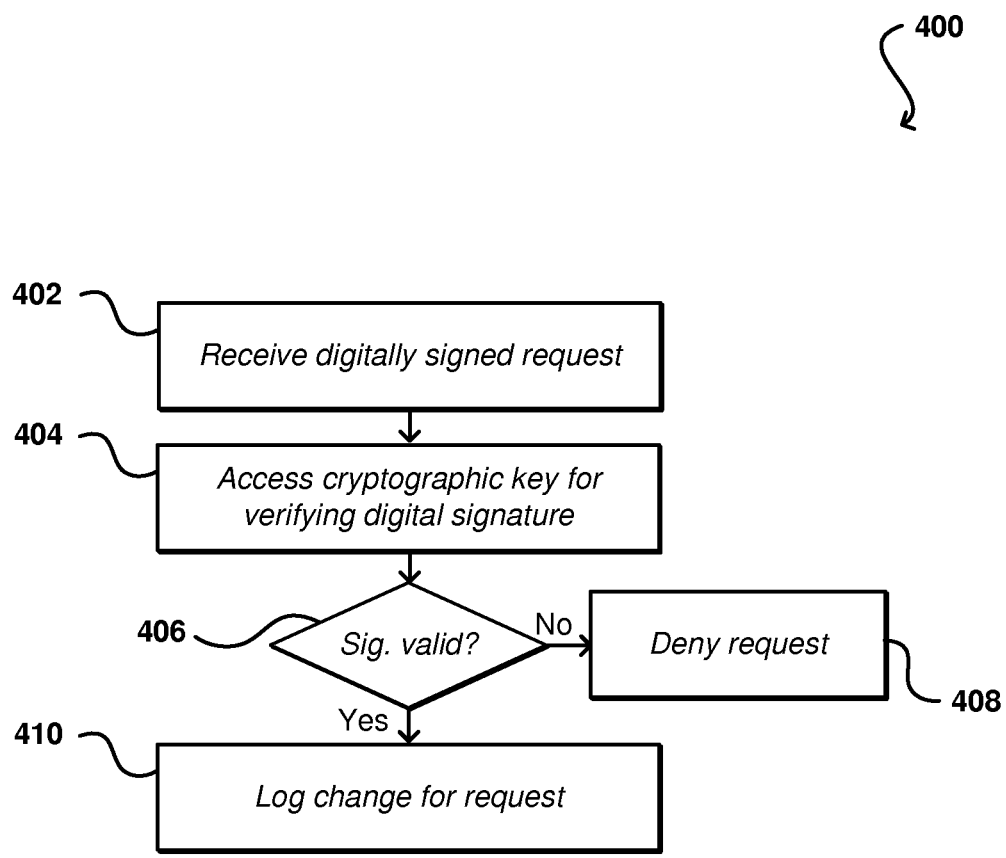
FIG. 4 illustrates an example process for logging database operations that can be utilized in accordance with various embodiments.

FIG. 4 illustrates such an example process 400 that can be utilized in accordance with various embodiments. The process 400 may be performed by any suitable system, such as a storage command initiator described above in connection with FIG. 2. In the example, a digitally signed request is received 402, such as is described above. A cryptographic key for verifying a digital signature of the request is accessed 404, and a determination is made 406 as to whether the signature is valid. If the signature is determined to be invalid, the request can be denied 408. However, if it is determined that the signature is valid, a change for the request (e.g., a database mutation) can be logged 410 that corresponds to fulfillment of the request that was received. For example, if the request was a request to store data, a logged entry may indicate that the data that was stored. As another example, if the request was to increment a value by a certain amount, a logged entry may indicate the value that was indicated by a certain amount. Other data storage operations resulting in the mutation of a data set may also be performed.

While not illustrated in the figures, additional operations may be performed as part of performance of the process. For example, in the processes 300 and 400 described above, additional operations, such as transmitting acknowledgments of fulfillment of the requests, may be performed. Further, when a storage operation command is transmitted, the process may also include receiving an acknowledgement that the storage operation command was received and/or fulfilled. Generally, the various environments in which the techniques of the present disclosure may be practiced may result in variations to the processes described herein.

Figure 5:
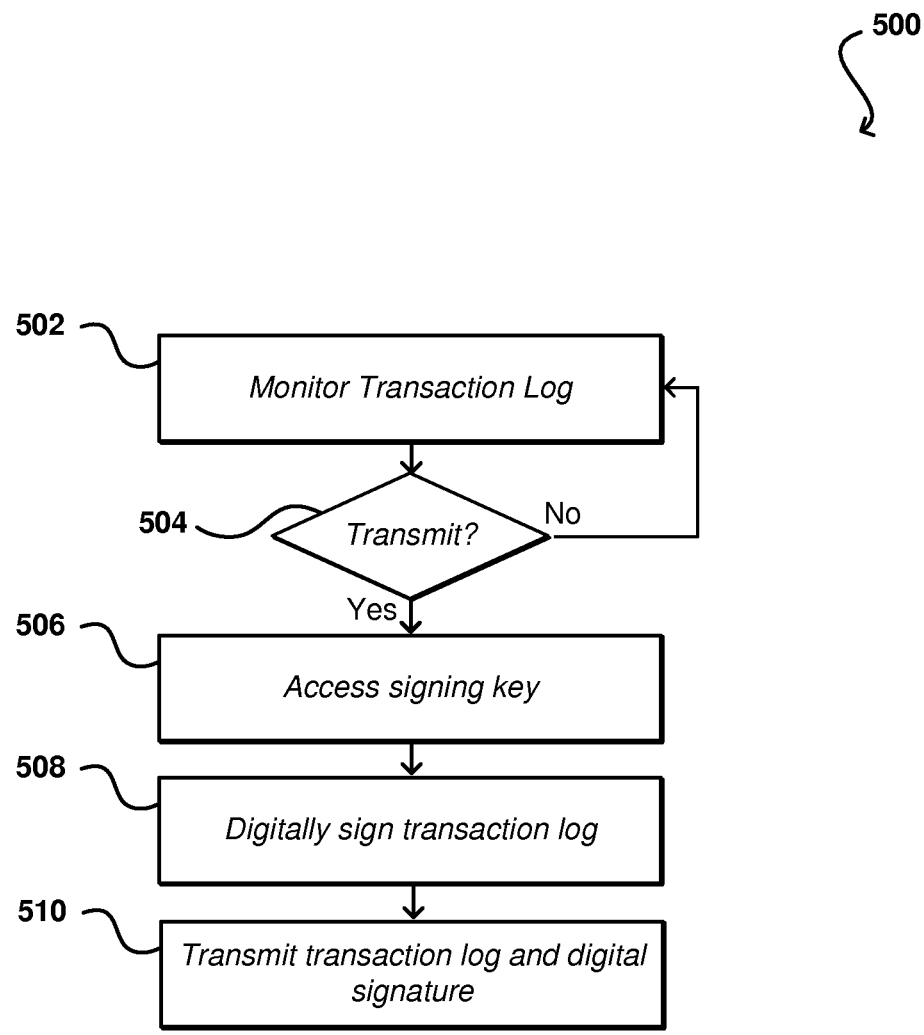
FIG. 5 illustrates an example process for transmitting a database transaction log that can be utilized in accordance with various embodiments.

FIG. 5 shows an example process 500 for transmitting transaction logs that can be utilized in accordance with various embodiments. The process may be performed by any suitable system, such as a storage command initiator as described above. In this example, a log, such as a database transaction log, is monitored 502 using any of a number of approaches discussed or suggested herein. In some examples the log is monitored for size, which can be measured in a number of recorded transactions. In other examples, the log may be monitored for an amount of time that has passed since some event, such as the creation of the log or the creation of a record in the log that has not been synchronized with a backend system. A determination is made 504 as to whether to transmit the transaction log. The determination can be based, at least in part, on one or more measurements made during monitoring of the transaction log. The measurements can include, for example, an amount of time that has passed since an event and/or the size of the log.

If it is determined 504 not to transmit the transaction log, monitoring of the transaction log may continue. If, however, it is determined 504 to transmit the transaction log, a signing key can be accessed 506 as discussed above. The signing key may be a cryptographic key usable to generate an electronic signature that is verifiable by a system to which the transaction log is to be submitted. Further, the signing key may be selected from a plurality of signing keys which may each have different scopes of use. In some examples, embodiments are implemented in multi-tenant environment where computing resources are maintained on behalf of multiple customers of a computing resource service provider. A key associated with a particular customer that is also associated with the transaction log being monitored may be selected. Similarly, a system performing the process may have access to multiple keys, each corresponding to different databases. Accessing the signing key may be performed by selecting a signing key associated with a database for which the transaction is being monitored. Also, as noted above, a signing key may have been already accessed in order to verify a digital signature of an API request that was received and, accordingly, the signing key may have already been accessed.

The accessed signing key can be used to digitally sign 508 the transaction log. Digitally signing the transaction log may be performed in any suitable manner, such as described above. The digitally signed transaction log can be transmitted 510 to another system or device, such as a compute-enabled storage device. In this manner, the storage device to which the transaction log is transmitted can verify the digital signature that was generated by digitally signing the transaction log to determine how the transaction log should be processed.

As with various processes described herein, variations of the process 500 are considered as being within the scope of the present disclosure. For example, FIG. 5 shows the process where a transaction log is monitored and then digitally signed for transmission at an appropriate time. In some embodiments, a system performing the process 500 may generate a new transaction log each time a previous transaction log is transmitted to be processed by another system. Thus, for example, upon performance of the process 500, a new transaction log may be created in order to record fulfillment of subsequently-received storage operation commands. In some embodiments, however, a single transaction log is used throughout multiple performance of the process 500 or variations thereof. Accordingly, the process 500 may be modified so that a portion of the transaction log is digitally signed, such as a portion that is to be transmitted for processing by the system to which the portion of the transaction log is transmitted. In this manner, additional events may be recorded into the transaction log, but only a portion is transmitted at a time, and only the portion that is being transmitted at a particular time is digitally signed to enable a receiver of the transmission of the portion of the transaction log to verify the digital signature. Other variations are also considered as being within the scope of the present disclosure.

Figure 6:
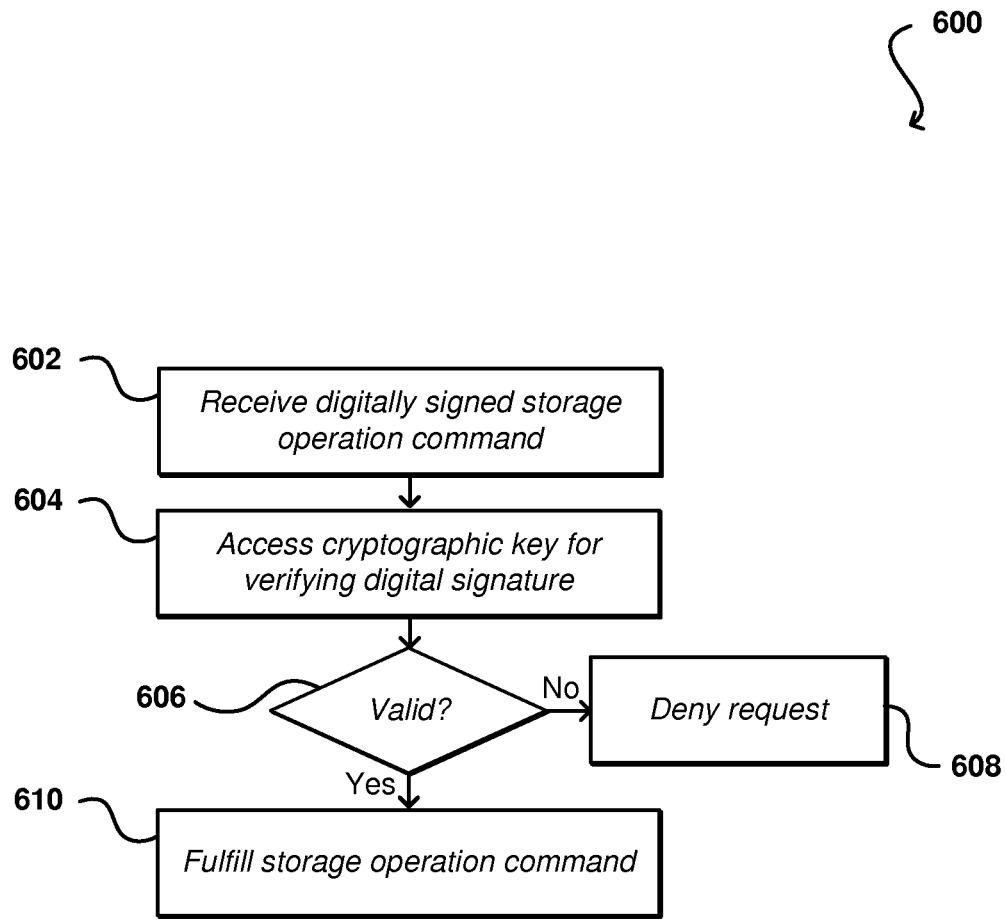
FIG. 6 illustrates an example process for fulfilling a storage operation command that can be utilized in accordance with various embodiments.

FIG. 6 shows an example process 600 for processing storage operation commands that can be utilized in accordance with various embodiments. As mentioned, the process 600 can be performed by any suitable system, service, or device, such as a compute-enabled storage device including the capability to process such commands. In this example, a digitally-signed storage operation command is received 602 by a compute-enabled storage device. The digitally signed storage operation command may be received in various ways, such as over a storage bus using a specific protocol, or over a network separating the system that issues the system that issued the storage operation command and the system performing the process 600. The storage operation command may be in various forms in accordance with various embodiments. For example, in some embodiments the storage operation command is a communication instructing to perform a particular data operation or set of data operations. As noted above, however, the storage operation command can come in the form of a transaction log. Thus, the storage operation command may be considered to be a command to process a transaction log, such as described in more detail elsewhere herein. Upon receipt of the digitally signed storage operation command, the compute-enabled storage device can access 604 a cryptographic key for verifying the digital signature of the storage operation command. As noted above, systems performing various processes described herein may have access to multiple cryptographic keys, such as cryptographic keys for multiple customers and/or multiple for multiple uses. This can include, for example, a different key for each database or each portion (i.e., table) of a database or other data store. Accordingly, accessing the cryptographic key for verifying the digital signature of the storage operation command may include selecting a cryptographic key from multiple cryptographic keys. In some embodiments, information received in the storage operation command may enable selection of the cryptographic key. For example, the command may include an identifier for a customer, of a database, of a table in a database, of a cryptographic key, or of other information associated with the cryptographic key that is accessed.

In this example, a determination is made 606 as to whether the digital signature of the digitally signed storage operation command is valid. Determining whether the signature is valid may be performed using any of various approaches discussed herein. For example, the accessed cryptographic key may be used to generate a reference digital signature of the storage operation command and the determination as to whether the signature is valid may include comparing the reference digital signature to the digital signature that was received with the storage operation command. If it is determined that the signature is not valid, the request can be denied 608 or otherwise handled appropriately. For example, an error message or alert may be transmitted to the system, service, or device that transmitted the storage operation command so that appropriate corrective action can be taken, such as may include recalculating a digital signature, re-attempting to issue a storage operation command, and/or notifying one or more users of the error so that corrective action can be taken. If it is determined that the signature is valid, the storage operation command can be fulfilled 610 (e.g., performed) by the compute-enabled storage device. Fulfilling the storage operation command can include, for example, performing one or more data operations corresponding to the storage operation command that was received. Further, as noted above, if the storage operation command is in the form of a database transaction log, fulfilling the storage operation command can include processing the database transaction log so that transactions recording in the transaction log are persistently stored in the compute-enabled storage device.

As mentioned, a compute-enabled storage device, or array of such devices, can perform a variety of tasks and process a variety of commands. These can include simple storage tasks as performed in conventional storage devices. The compute ability also enables such a device to perform tasks such as de-duplication, indexing, and snapshotting. At a low level such a device is able to decrypt the data, analyze the cleartext, and semantically interpret the bits. In the case of boot volumes, operations such as synthetic reads can be performed wherein the key will only be read once by each customer and that key is usable to sign future requests. When a compute-enabled device receives a command, the device can determine whether to process the command and/or allow the associated operation. The device can also determine whether to form at least one transformation using at least one of the keys available to the device, and which of the keys available to the device to use to perform the transformation. In such an example, a read from the current guest could receive cleartext, and a read from a backup or synchronization process might receive ciphertext as discussed in more detail elsewhere herein. The ability to authenticate to a compute-enabled storage device and determine whether to process commands on the data provides significant advantages over conventional storage device operation, particularly for a multi-tenant device. In some embodiments, the key that is usable to authenticate in such a situation might only be available from a secure data enclave.

There can be various ways to return the data based on the authentication as well. For example, in a first situation, such as where a block driver negotiates SSL with a compute-enabled device over a specified data channel, a call to the device that is authenticated by the device can receive the requested data, or have the command processed. An unauthenticated call will not receive the requested data or have the call processed. By layering on encryption as discussed herein, an authenticated call can receive a first response, for example, while an unauthenticated call, or call authenticated to a different identity, might receive a different response.

Figure 7:
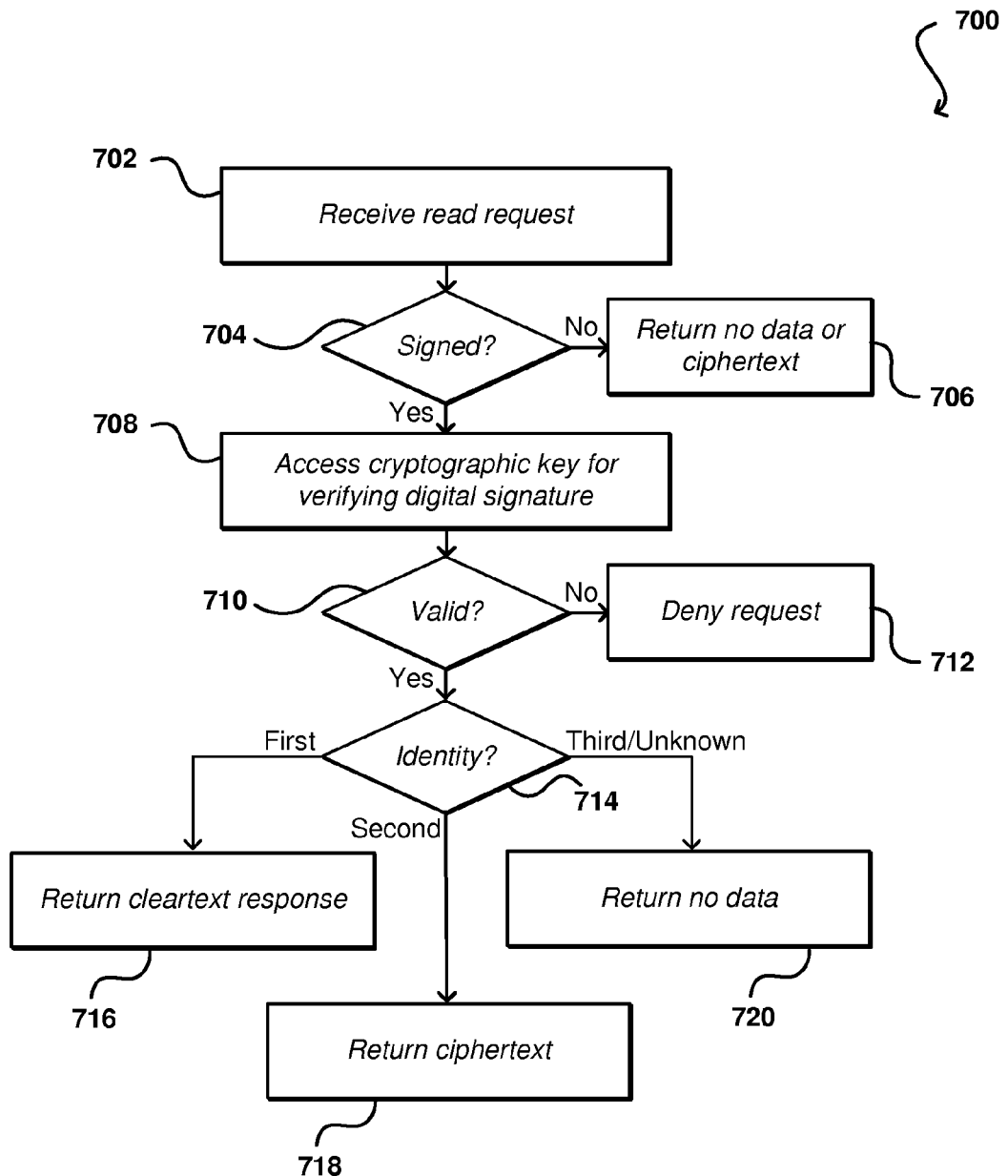
FIG. 7 illustrates an example process for providing versions of text that differ based at least in part upon the identity of the requestor that can be utilized in accordance with various embodiments.

FIG. 7 illustrates an example process 700 wherein different types of responses can be provided by a compute-enabled storage device based at least in part upon the identity associated with a data storage operation. In this example, a request is received 702 as discussed elsewhere herein. A determination can be made 702 as to whether the request is digitally signed, and if not then no data or ciphertext can be returned 706, such as may depend upon identity as discussed later herein. In some cases, a request with an invalid signature may always be denied. The request may involve other operations as well, but at least includes the task of returning data from the data storage device. As mentioned elsewhere herein, the compute-enabled storage device can access a cryptographic key 706 for verifying the digital signature, and a determination is made 708 as to whether the signature is valid. If not, the request can be denied 710. If valid, another determination can be made 712 (which might be part of the same step in some processes) as to the identity of the source of the request. The operation performed can depend at least in part upon the identity.

For example, a first call authenticated to a first identity might cause a response to be returned 714 that includes the requested data in plaintext or cleartext. Other processes can be performed for the first identity as well, such as to have the command processed as requested, potentially over a secure channel. Other identities can have different operations performed. For example, in some embodiments a second call authenticated to a second entity might cause a response to be returned 716 that includes the requested data in ciphertext, or another such encrypted format. In order to access the cleartext, the entity receiving the ciphertext would need a copy of the appropriate encryption (or decryption) key. A third call authenticated to a third identity, or a call for which an identity cannot be determined, might not receive a response or might at best cause a response to be returned 718 that does not include any of the data for the request. Such an approach can enable various types of functionality, such as to enable a provider to rebalance overlaid virtual sectors among multiple physical disks. In such a situation, the second identity capable of receiving ciphertext could be, for example, an agent corresponding to a provider that moves data between physical devices, causes simple backups or snapshotting, etc. In some embodiments the way in which a request was authenticated could be utilized, as keys may only be issued to code running in a trusted enclave, for example. Such an approach allows the standard resource management features of the underlying OS to proceed, except that the processing will be performed on encrypted data. Access to plaintext can be restricted to appropriately authenticated code.

Figure 8:
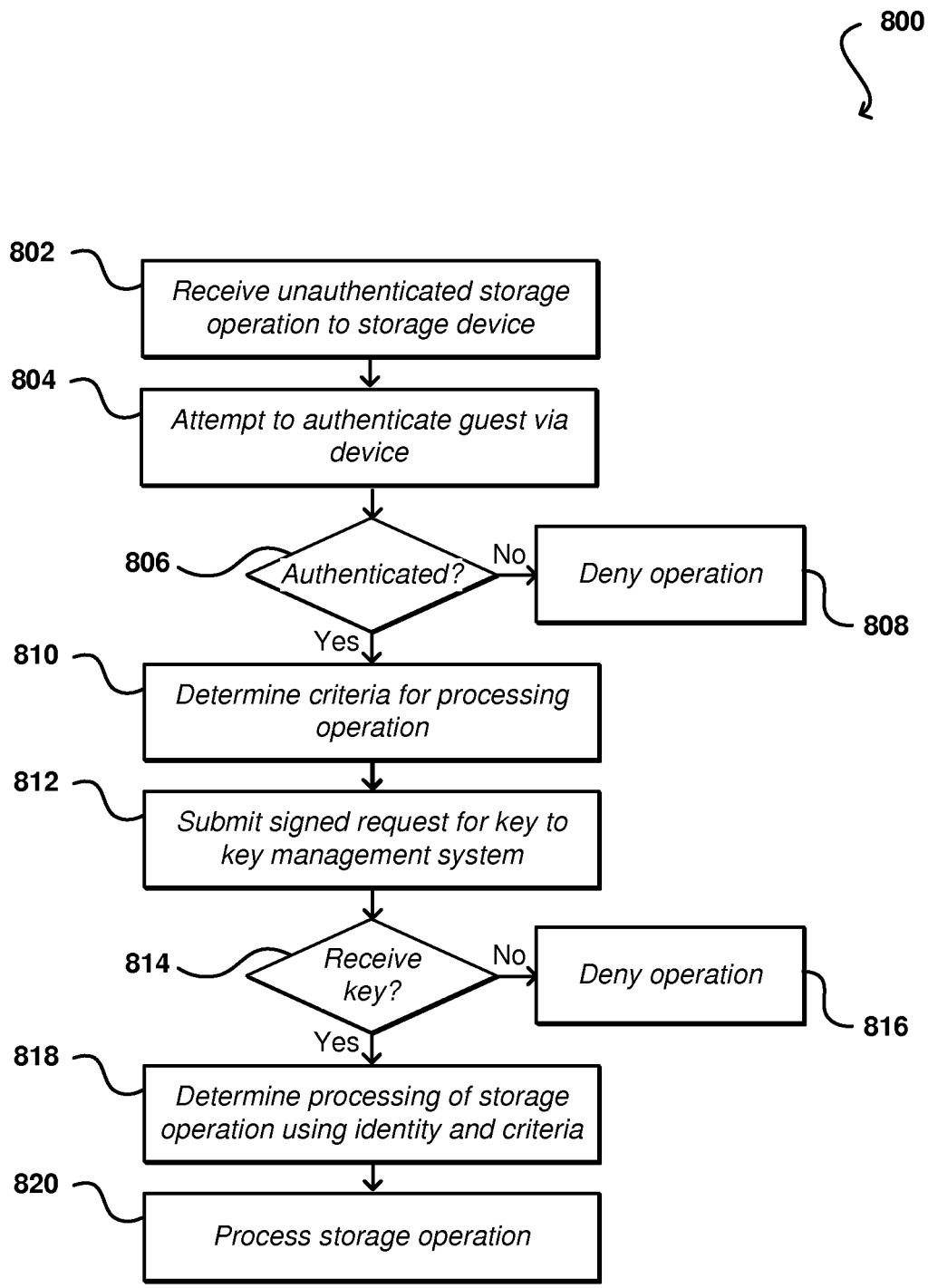
FIG. 8 illustrates an example process for enabling a compute-enabled storage device to obtain a key for an unauthenticated guest storage operation that can be utilized in accordance with various embodiments.

In another approach, an authenticated call to a compute-enabled storage device can cause the device to use forward access to attempt to fetch the key requisite to decrypt the data. FIG. 8 illustrates such an example process 800 for processing storage operations that can be utilized in accordance with various embodiments. In this example, an unauthenticated storage operation or call is received 802 to a compute-enabled storage device. The request can be received from, for example, a process executing in a guest in a hypervisor provided in a multi-tenant environment. The unauthenticated request can include a command to read out a sector from the storage device, for example, where the device has not previously communicated with that guest. The storage device can attempt to authenticate 804 the guest as discussed herein. If the guest is determined 806 to not able to be authenticated, the operation can be denied 808. If authenticated, the compute-enabled storage device can also attempt to determine 810 one or more criteria needed for that guest to be able to perform the operation, such as to retrieve data from the device in either plaintext or ciphertext. The storage device can submit 812 a signed request for a key to a key management system or other such credential source. The device can make a call for a specific key, acting on behalf of a guest corresponding to a customer, where that call is signed (i.e., contains a signature). The key management system can then make a decision as to whether to issue that key. If the key is not received 814, the operation can be denied. If the key is received to the storage device from the key management system, the identity information and criteria can be used to determine 818 how to process the storage operation as discussed herein, such as in the process of FIG. 7. The compute-enabled storage device can then process 820 the storage command as determined, such as to provide plaintext or ciphertext in response to the request. The call or request for a storage command to be performed on behalf of a customer can be made in any of a number of different ways in any of a number of different forms. For example, a call can be in the form of a disk issuing an error and indicating that an application should fetch data from the key management system based on the application of the network client. A kernel driver could potentially use physical hosts to perform such actions on behalf of a storage device. IP can be channeled over SATA, for example, and the connection can be performed by an entity or component other than the storage device. A key requested by a compute-enabled storage device from a key management service can be routed through the request kernel driver, a router, the Internet, etc.

As mentioned, the ability to bootstrap an authentication key to a storage device provides additional functionality not offered by conventional storage devices. For example, a special command or read to a particular location can be used to trigger a key exchange, where a key or key form can be used to create a data context on the device. Operations authenticated with the appropriate key could have a first level of access to that data context, and operations not authenticated with that key, or authenticated with a different key, can obtain a second level of access to that data context. Rather than requiring access to a key management system, each source of a storage operation can negotiate a key with the storage device, whereby the device itself can authenticate operations. The storage device then can be responsible for honoring only those operations authenticated with the negotiated key. Any number of keys can be utilized, but specific writes or commands must the tied to the appropriate key to be processed. In some embodiments, a key can be used to select a block map, whereby different users can negotiate different keys, read or write data at offset zero, and receive different virtualized views of the zero sector.

Various approaches can be used to obtain the key for such purposes. For example, a customer or guest can negotiate a key for virtual reads and writes. In some embodiments a derived MAC key can be provided that may be encrypted to a different key that is known to be available to the storage device. Public key certificates can also be used in various embodiments. Various mechanisms can be used to provide authorizations as well. In some embodiments, a list or other collection of authorizations can be maintained that indicates which commands can be processed, or how those commands are to be processed, for different users or types of users. While some authorizations can be tied to specific keys, in other embodiments a fully flexible policy language might be used that could send requests to a key management service and can maintain a facility for receiving additional keys encrypted with a key that is burned into the storage device and not exportable.

Figure 9:
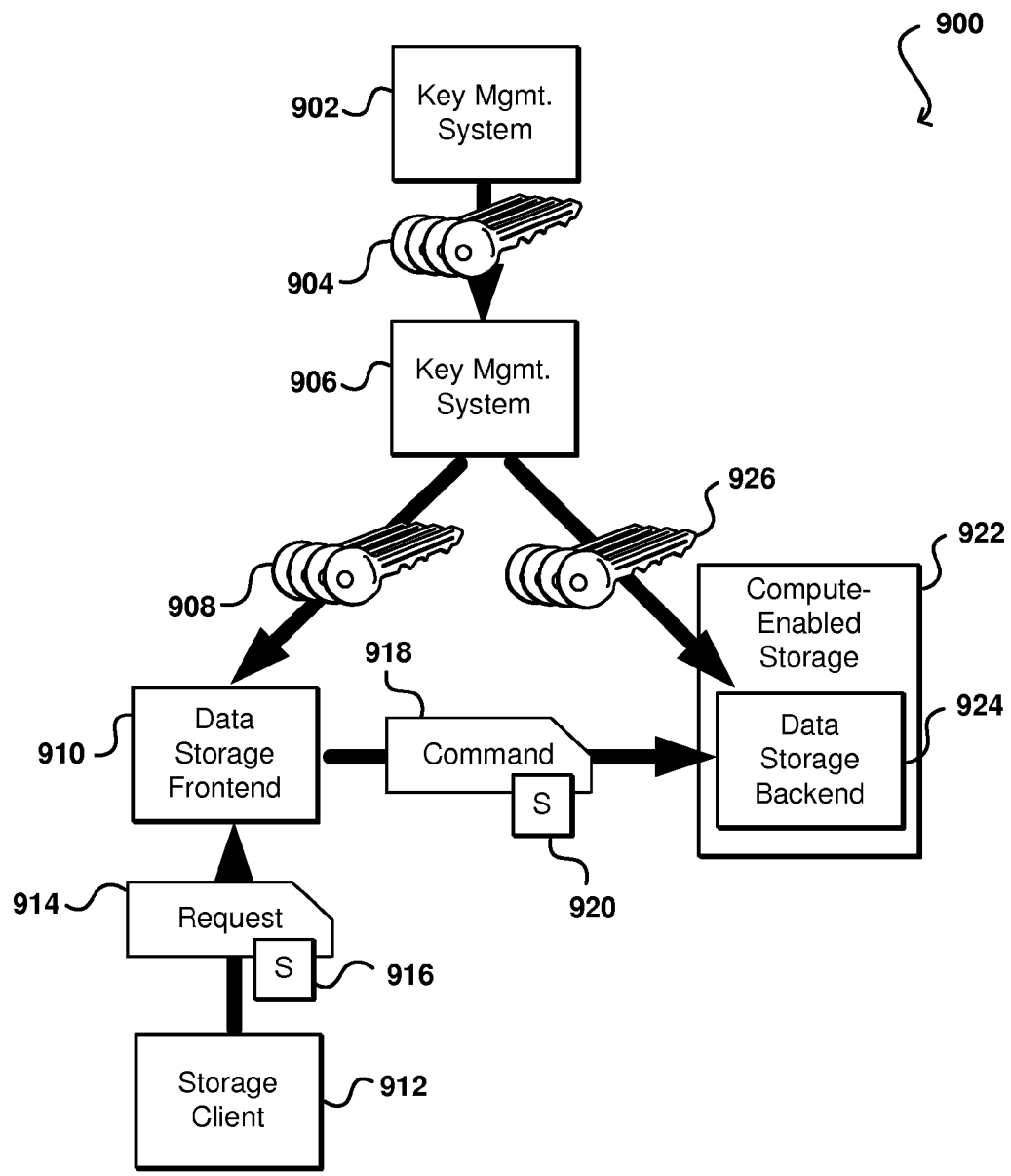
FIG. 9 illustrates an example environment in which various embodiments may be implemented.

As noted above, techniques described herein are usable in a variety of computing environments. FIG. 9 shows an example environment 900 in which various embodiments may be implemented. In this example, the environment 900 includes a data storage frontend 910 and a data storage backend 924, where the data storage backend executes in a compute-enabled storage device 922. The data storage frontend may comprise one or more computing devices, systems, or modules configured to provide an interface to which data storage is accessible. For example, the frontend 910 may comprise a fleet of client computing nodes, each node comprising a computing device. The backend 924 in some examples can comprise a fleet of storage nodes, each storage node comprising at least one compute-enabled storage device operable to manage and enable access to its own persistent data storage. A given client node may host a number of clients (e.g., in the form of virtual machine instances) that are each able to access at least a portion of the storage nodes. In a situation where a storage device is divided or partitioned among a plurality of customers in a hypervisor, for example, the storage device also has to be able to determine which of the appropriate set of keys is to be used for a particular storage command. The hypervisor or DOM-0 can access credentials (i.e., pull the appropriate keys) for the customers and perform the necessary translation, encryption, and digital signing to generate the commands to be submitted to the storage device for the various customers. In this case, the customer can be unaware of the encryption processes and simply submit the appropriate input/output commands. The storage device can access the appropriate credentials or keys to decrypt the data as necessary and process the storage command. In such a situation, the storage device can ensure that the data is only readable by the appropriate customer.

In another embodiment, a customer driver can be configured to sign requests on behalf of a customer. A block frontend driver in the guest frontend can sign a portion of the command, and the backend driver can operate in the DOM-0 or kernel, with the backend driver transmitting the command to the storage device to ensure that the command is properly authenticated. In this example, the customer does not have to provide keys to the hypervisor or DOM-0, as the hypervisor and block back device can pass the command without knowledge about the encryption.

In various embodiments, the data storage frontend 910 and data storage backend 924 can be under the control of the same entity. In some examples, the data storage frontend 910 and data storage backend 924 communicate over an isolated network, isolated bus, or other such mechanism that is under the control of the entity. The data storage frontend 910, in some embodiments, includes a web server that processes web service requests to perform various operations in accordance with data stored by the compute-enabled data storage device. In some examples, a web server or other server of the data storage frontend 910 maintains, in volatile memory, copies of databases which are maintained by the data storage device(s) provided collectively by the data storage frontend 910 and data storage backend 924. In this manner, the data storage service frontend 910 is able to quickly perform data operations. Thus, a data storage device is able to provide low latency data processing capabilities in connection with one or more databases maintained therein. The data storage service backend 924 may comprise one or more compute-enabled data storage devices (and potentially one or more non-compute enabled data storage devices as well) that persistently store one or more databases corresponding to one or more in-memory databases stored by the data storage frontend 910.

As discussed elsewhere herein, the data storage frontend 910 may provide updates to the data storage backend 924 to synchronize the databases stored in volatile memory at the data storage frontend 910 and in nonvolatile memory in the data storage backend 924. For example, in some embodiments, a storage client 912 can transmit a digitally signed request 914 to the data storage frontend 910. As the request is digitally signed, the request can be transmitted by the client 912 with a digital signature 916 which can be verified by the data storage frontend 910 as described above. The data storage frontend 910 may process the request 914 in various ways in accordance with various embodiments. For example, data storage frontend 910 may issue a storage operation command 918 to the data storage backend 924 as part of fulfilling the request 914. In other embodiments, however, the data storage frontend 910 may fulfill the request 914 and asynchronously transmit a storage operation command 918 to the data storage backend 924.

In various embodiments, the storage operation command 918 is digitally signed and therefore the data storage frontend 910 transmits the storage operation command 918 with a digital signature 920. As noted above, a cryptographic key used to verify the digital signature 916 from the client 912 may be used to generate the digital signature 920 of the storage operation command 918, although different keys may be used by the data storage frontend 910 for generation of the other digital signature 920. In some embodiments, a first cryptographic key is used to verify the digital signature 916 from the client and a second cryptographic key is used to generate the digital signature 920 for the storage command. Either cryptographic key can be derived from the other, although in terms of derivation the cryptographic keys can be independent from one another.

As noted above, the keys used to verify digital signatures and generate digital signatures may be provided to the systems that performed digital signature verification and generation. Accordingly, as illustrated in FIG. 9, the environment 900 includes a first key management system 902 and a second key management system 906. In some embodiments, the first key management system 902 has access to cryptographic keys shared with various service clients who may be customers of a computing resource service provider that provides the data storage service. The first key management system 902 may transmit keys 904 derived from those shared cryptographic keys to second key management system 906. In one example, the first key management system 902 is a central key management system used to provide cryptographic keys to various subsystems of a distributed computing environment that is distributed among multiple regions. The second key management system 906 may comprise a key management system in a particular region (i.e., a regional key management system) and the keys 904 provided from the first key management system 902 to the second key management system 906 may be generated (i.e., derived from the clients of the service) so as to only be usable within the particular region of the second key management system 906. The second key management system 906 may use one or more of the received keys 904 to derive keys 908 that are provided to the data storage frontend 908 and keys 926 that are provided to the data storage backend 924 to enable the data storage frontend and backend to perform signature verification and/or generation. The derived keys 908, 926 may be generated using the keys 904 provided from the first key management system 902 so as to have a smaller scope of use; that is, to be useable for a smaller set of uses.

The management of cryptographic keys may be performed to ensure data security. For example, in an embodiment, cryptographic key management is performed such that a client node and/or a storage client implemented by the client node is able to access only a subset of the data that is collectively stored by the storage nodes of the backend system. As an illustrative example, each storage client may be implemented on behalf of a corresponding customer of a computing resource service provider and key management may be performed so that a particular client is only able to access data stored on behalf of its corresponding customer. To do this, the key management system 906 may provide each client node in the data storage frontend 910 with keys in accordance with the data the client nodes are to be able to access. For example, if a particular client node hosts clients for a proper subset of a set of customers of a computing resource provider, the particular client node may be provided keys for those customers in the proper subset without being provided keys for customers outside of the proper subset. Similarly, in embodiments where clients implemented by client nodes are customer (or other entity) specific, a client may be provided access only to one or more cryptographic keys of that customer (or other entity). Similarly, a data storage node of the data storage backend 924 may be provided keys for entities on behalf of which the data storage node stores data while not being provided keys for entities for which the data storage node does not store data. In this manner, a client node and/or client implemented by the client node is provided only keys corresponding to data that the client node and/or client is authorized to access.

Figure 10:
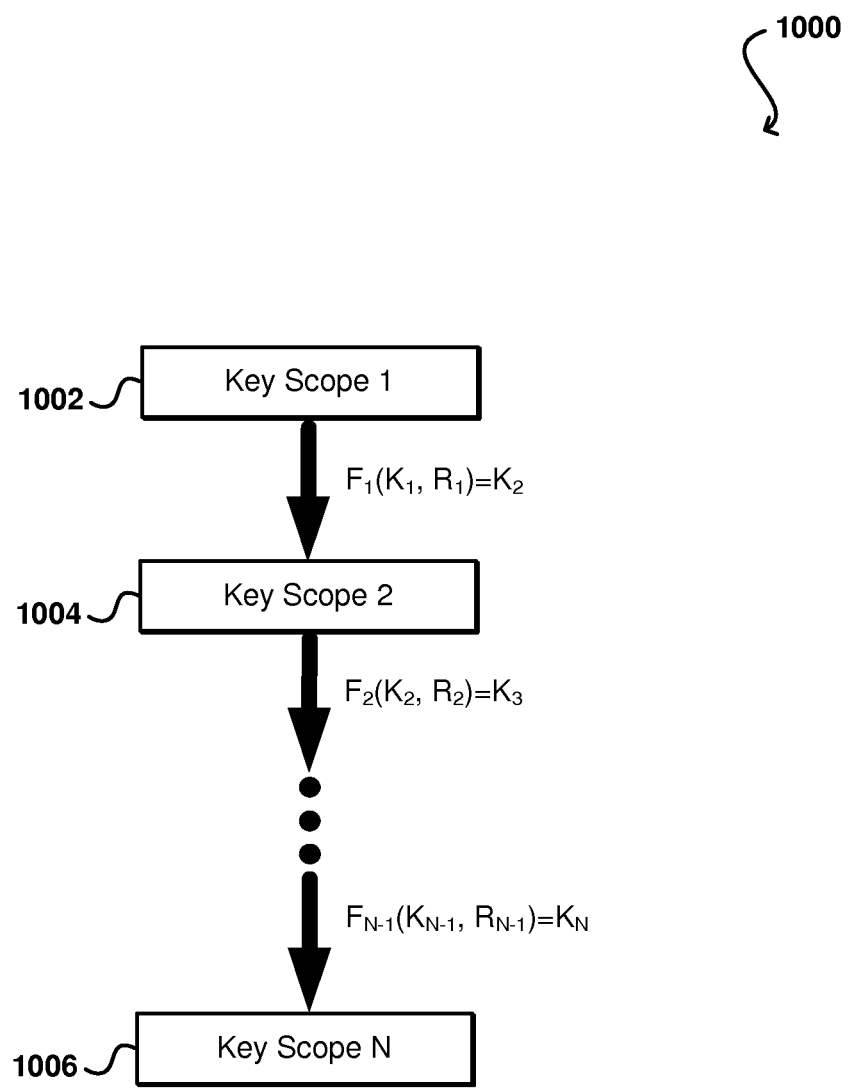
FIG. 10 illustrates an example diagram illustrating cryptographic key scoping in accordance with various embodiments.

FIG. 10 shows an illustrative example of a diagram illustrating the scoping of cryptographic keys in a manner usable in accordance with various embodiments of the present disclosure. In an embodiment, a first key has a first key scope 1002 (labeled as "Key Scope 1" in the figure). The first key may, for instance, be a key shared as a secret between a computing resource service provider and a customer of the computing resource service provider or, generally, a key shared between two entities. The first key scope may correspond to a set of uses for which the first key is usable (e.g., a set of uses for which use of the first key is usable for successful authentication of messages). As an example, the first key may, through appropriate derivation, be usable in multiple regions of a computing resource service provider by using an encoding of each region to derive, from the first key, a suitable regional key.

Accordingly, as illustrated in FIG. 10, the first key may be used to derive a second key having a second key scope 1004 (labeled as "Key Scope 2"). While omitted from the drawing to avoid obscuring the illustration, the first key may be used to derive multiple second keys, each with a different second key scope. This second key may be used to derive a third key, which may be used to derive another key, and so on. To derive a series of keys one from another, the following formula, or variations thereof, may be used:

$$K_N = F_{N-1}(K_{N-1}, R_{N-1})$$

where $K_N$ is the Nth derived key (N being a positive integer), $F_{N-1}$ is a one-way function or otherwise based, at least in part, on a one-way function, such as a cryptographic hash function or a key derivation function, described above, and $R_{N-1}$ is an encoding of a restriction. Thus, the allowable scope 1006 of use for $K_N$ is the scope of use of $K_{N-1}$ restricted by the restriction corresponding to $R_{N-1}$. Each encoding of a restriction $R_i$ may be an encoding of a different restriction, such as described above and below. Each function $F_i$ may be the same function or different functions $F_i$ (for some or all different values of i) may be different.

Figure 11:
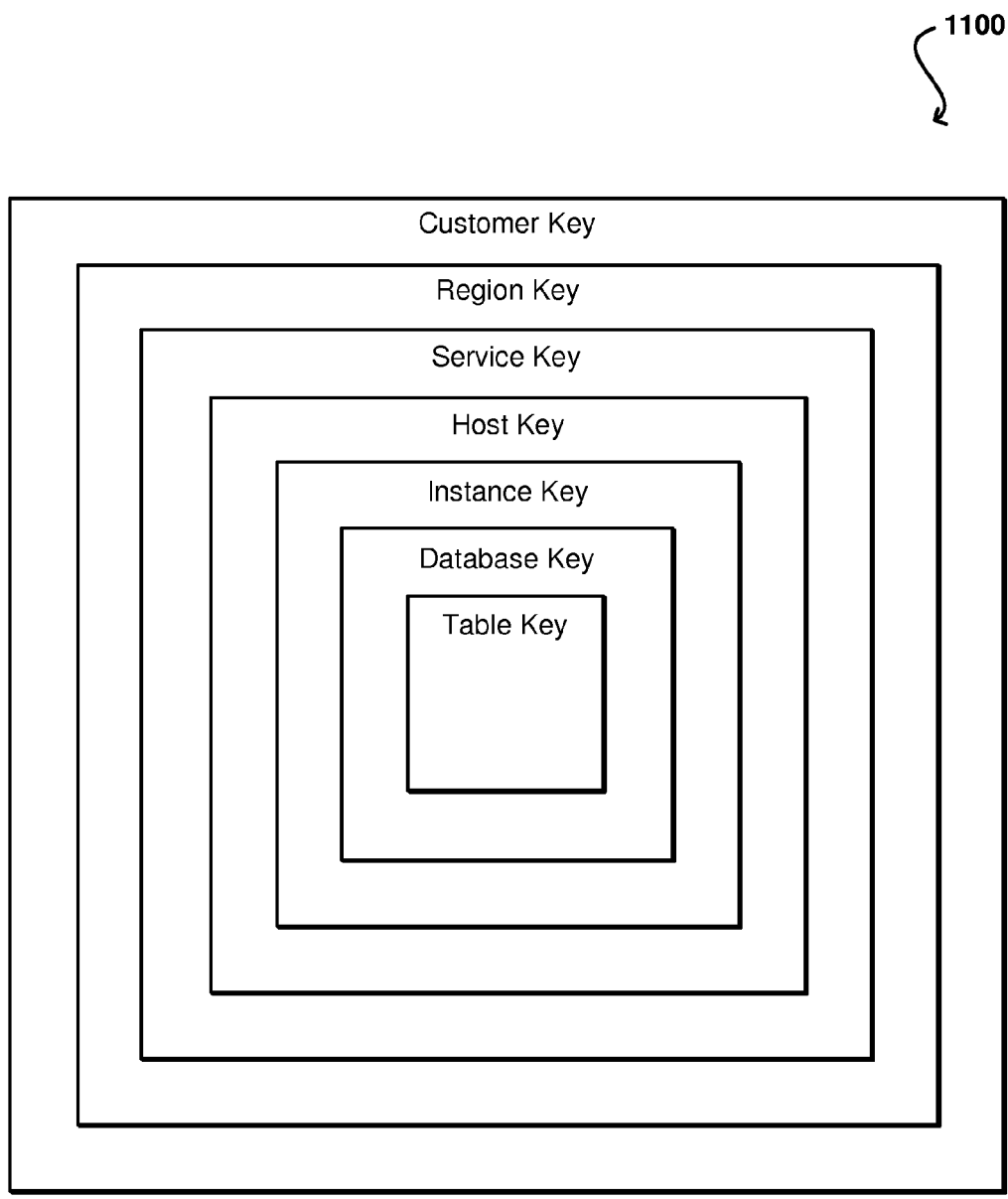
FIG. 11 illustrates an example of different cryptographic key scopes achieved through cryptographic key derivation in accordance with various embodiments.

As discussed above, numerous types of restrictions may be used to scope cryptographic keys. FIG. 11, accordingly, shows an illustrative example 1100 illustrating one way in which a cryptographic key may be scoped. In this particular example, a series of boxes appears where each box represents a scope of use of a cryptographic key. The boxes are arranged in a Venn diagram so that, if a first box is contained in a second box, set of uses for which a first cryptographic key is usable is a proper subset of a set of uses for which a second cryptographic key is usable, where the first cryptographic key is directly or indirectly derived from the second cryptographic key.

In this illustrative figure, a customer key may be a key shared between a computing resource service provider and a customer of the computing resource service provider. The customer key may be usable to validly digitally sign requests that the customer is authorized to make (i.e., requests that the customer is able to submit and cause to be fulfilled). It should be noted that, to be usable for all uses for which the customer is authorized, it may be necessary to use the key to derive another key that is used as a signing key. In various embodiments, the encodings of restrictions are public or otherwise available to the customer so that the customer (through an appropriate computing device) is able to derive a key appropriate for a particular use. For instance, to sign an API request to be transmitted to a particular region of the service provider, the customer may derive a signing key based at least in part on the encoding for the region. Such may be necessary, for example, when devices used to verify signatures in the region lack access to the customer key and, therefore, are unable to verify digital signatures generated directly using the customer key.

As illustrated, the customer key may be used to derive a region key, usable only within a particular region. The region key may be used to derive a service key, usable only to submit requests to a particular service operated in the region. The service key may be used to derive a host key, which may be a key usable only on a particular computing device (host). The host key may be used to derive an instance key, which may be a key usable only on a particular virtual machine instance supported by the host. The instance key may be used to derive a database key, which may be a key usable only for operations on a particular database. The database key may be a key usable only for operations on a particular table of the database (in embodiments where the database utilizes table structures). The particular restrictions and order in which keys are derived are illustrative in nature and various embodiments may utilize fewer restrictions and/or may perform key derivations in a different order than illustrated in the figure. Other restrictions may also be used, such as time-based restrictions, identity-based restrictions and, generally, any way by which a set of uses of a cryptographic key is restrictable.

The various keys and scopes represented in FIG. 11 (and variations thereof) may be derived in various ways in accordance with various embodiments. For example, different devices of different computer systems may perform the various derivations that ultimately result in a signing key being derived. For instance, a key management system may perform one derivation and transmit the result to another system which performs further derivation. In some examples, a device performing digital signature generation and/or digital signature verification may perform one or more derivations to obtain a signing (verifying) key. Features of a request and/or command may be used to determine which restrictions (e.g., which customer, which database, which table, which host, etc.) need to be used to perform one or more key derivations. Other variations are also considered as being within the scope of the present disclosure.

For example, as discussed above, a data storage client (e.g., frontend system, as above) may digitally sign requests to a data storage system (e.g., backend system, as above) for verification of the corresponding digital signatures by the data storage system. Results and other communications transmitted from the data storage system to the client may also be digitally signed in accordance with the techniques described above to enable the client device to authenticate communications from the data storage system. As another example, a client device or other device accessible to the client device may store one or more policies (e.g., access control policies) applicable to an entity for which data storage operations are performed. Communications from the client device to the data storage system may include an encoding of one or more policies to be enforced by the data storage system. The policies may comprise a portion of the communications that are digitally signed. The policies may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions (e.g., by encoding an access control list (ACL) or portion thereof) that must be satisfied for a data storage operation to be performed.

Figure 12:
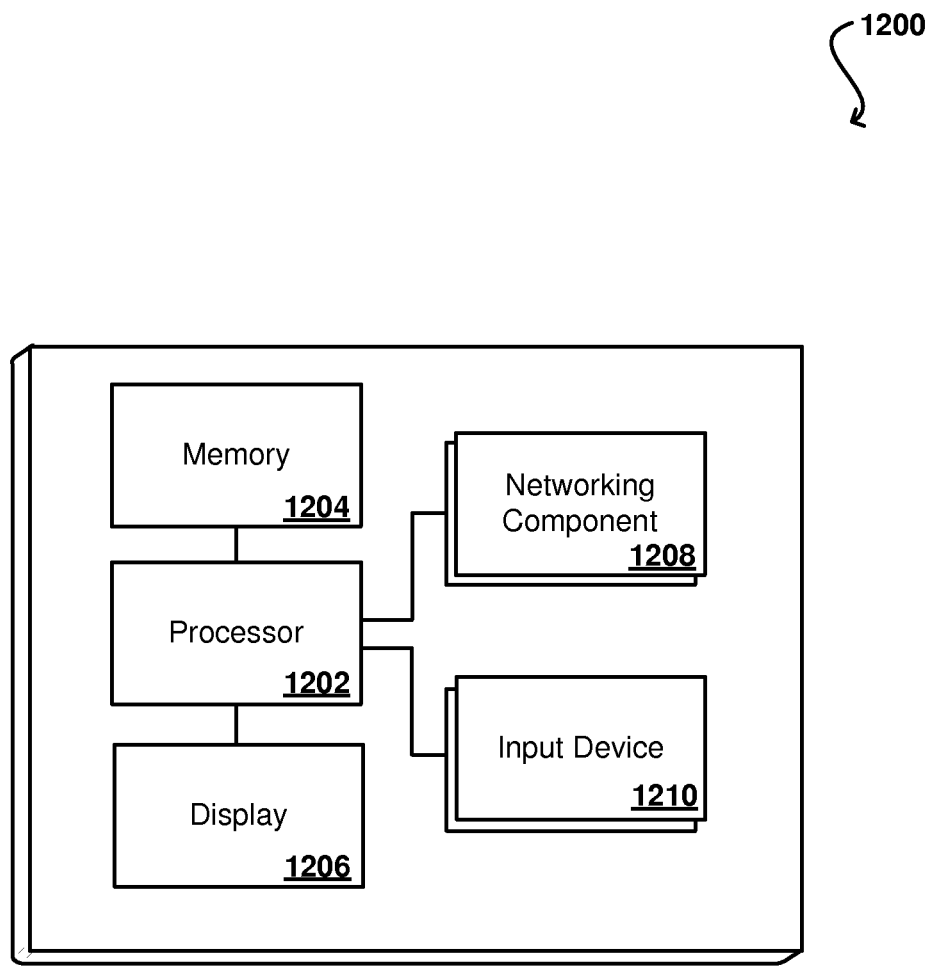
FIG. 12 illustrates example components of a computing device that can be used to implement aspects of various embodiments.

FIG. 12 illustrates a set of basic components of an example computing device 800 that can be utilized to implement aspects of the various embodiments. In this example, the device includes at least one processor 1202 for executing instructions that can be stored in a memory device or element 1204. As would be apparent to one of ordinary skill in the art, the device can include many types of memory, data storage or computer-readable media, such as a first data storage for program instructions for execution by the at least one processor 1202, the same or separate storage can be used for images or data, a removable memory can be available for sharing information with other devices, and any number of communication approaches can be available for sharing with other devices. The device may include at least one type of display element 1206, such as a touch screen, electronic ink (e-ink), organic light emitting diode (OLED) or liquid crystal display (LCD), although devices such as servers might convey information via other means, such as through a system of lights and data transmissions. The device typically will include one or more networking components 1208, such as a port, network interface card, or wireless transceiver that enables communication over at least one network. The device can include at least one input device 1210 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A storage device, comprising:
   at least one non-transitory computer-readable storage medium for storing data on behalf of one or more users in a multi-tenant environment;
   at least one processor; and
   memory including instructions that, when executed by the at least one processor, cause the storage device to:
   receive, from a key management system, a cryptographic key;
   receive, from a first computing device of a corresponding user of the one or more users, an input/output command and a digital signature of the input/output command of the corresponding user, the input/output command received from a process executing in a guest of a hypervisor and the input/output command involving at least a read operation to be performed by the storage device with respect to data stored on behalf of the corresponding user of the one or more users in the multi-tenant environment, the digital signature generated based at least in part on the cryptographic key;
   verify the digital signature of the input/output command using the cryptographic key;
   authenticate a user identity of the corresponding user associated with the input/output command; and
   fulfill the input/output command using (a) cleartext in response to determining that the user identity corresponds to a first identity and (b) ciphertext in response to determining that the user identity corresponds to a second identity.

2. The storage device of claim 1, wherein the instructions when executed further cause the storage device to:
   fulfill the input/output command at least in part by generating the cleartext by decrypting ciphertext, stored in the at least one non-transitory computer-readable storage, or generating the ciphertext by decrypting cleartext stored in the at least one non-transitory computer-readable storage.

3. The storage device of claim 1, wherein the instructions when executed further cause the storage device to:

return no data in response to at least one of the digital signature not being verified, the user identity not being authenticated, or the user identity determined to correspond to a third identity.

4. The storage device of claim 1, wherein the instructions when executed further cause the storage device to:
store a plurality of cryptographic keys capable of being used for at least one of encrypting or decrypting the data stored on the storage device; and
select, based at least in part on the corresponding user associated with the input/output command, the cryptographic key from the plurality of cryptographic keys stored by the storage device.

5. The storage device of claim 1, wherein the input/output command is received over a storage bus utilizing an embedded storage protocol.

6. The storage device of claim 1, wherein the instructions when executed further cause the storage device to:
fulfill the input/output command, in part, utilizing a device-level address that is specified by the input/output command and that is the source for data to be operated upon in the fulfilling of the input/output command.

7. The storage device of claim 1, wherein the instructions when executed further cause the storage device to:
receive, from the first computing device, a second input/output command and a second digital signature of the second input/output command, the second input/output command involving at least a write operation to be performed by the storage device;
verify the second digital signature using the cryptographic key; and
fulfill the second input/output command at least in part by writing at least one of a second cleartext, decrypted using a respective cryptographic key, or a second ciphertext of the data corresponding to the second input/output command to the at least one non-transitory computer-readable storage medium.

8. The storage device of claim 1, wherein the instructions when executed further cause the storage device to:
receive, from the first computing device, a second input/output command, the second input/output command unassociated with the digital signature; and
determine the second input/output command to be associated with the second identity.

9. A storage device, comprising:
at least one non-transitory computer-readable storage medium for storing data on behalf of one or more users;
at least one processor; and
memory including instructions that, when executed by the at least one processor, cause the storage device to:
receive an input/output command comprising a digital signature, the input/output command of a corresponding user of the one or more users and configured to cause the storage device to perform a storage operation with respect to the data stored, or to be stored, on the at least one non-transitory computer-readable storage medium, the input/output command received from a process executing in a guest of a hypervisor and the input/output command referencing a specific offset within an allocation of the at least one non-transitory computer-readable storage medium, the data stored or to be stored on behalf of the corresponding user, the digital signature associated with the corresponding user;
use a cryptographic key to verify the digital signature of the input/output command; and
as a result of the digital signature of the input/output command being verified, fulfill the input/output command.

10. The storage device of claim 9, wherein the instructions when executed further cause the storage device to:
obtain the cryptographic key from a key management system.

11. The storage device of claim 9, wherein the instructions when executed further cause the storage device to:
fulfill the input/output command in part utilizing a device-level address, specified by the input/output command, for data to be operated upon by fulfillment of the input/output command.

12. The storage device of claim 9, wherein the storage device comprises at least one of a solid state drive (SSD) or Serial ATA (SATA) drive.

13. The storage device of claim 9, wherein the instructions when executed further cause the storage device to:
derive the cryptographic key based at least in part on a second cryptographic key corresponding to data affected by the input/output command.

14. The storage device of claim 9, wherein the instructions when executed further cause the storage device to:
alter behavior of the storage device, with respect to the input/output command, based at least in part upon analyzing content of the input/output command.

15. The storage device of claim 9, wherein the instructions when executed further cause the storage device to:
obtain a first cryptographic key usable to decrypt a portion of the data responsive to the input/output command;
decrypt the portion of the data to obtain a plaintext version of the portion;
obtain a second cryptographic key usable for encryption;
encrypt the plaintext version to obtain encrypted output data; and
perform the input/output command using the encrypted output data.

16. The storage device of claim 15, wherein at least one of the first cryptographic key or the second cryptographic key is determined based at least in part upon the cryptographic key used to verify the signature of the input/output command.

17. The storage device of claim 15, wherein the instructions when executed further cause the storage device to:
perform one or more logical operations on the plaintext version prior to encryption of the plaintext version.

18. A method of performing an input/output command on a storage device including processing capability, the method comprising:
receiving, to the storage device, an unauthenticated input/output command and a digital signature of the unauthenticated input/output command to the storage device, the unauthenticated input/output command of a user of one or more users and received from a process executing in a guest of a hypervisor, the unauthenticated input/output command relating to data stored on the storage device on behalf of the one or more users;
transmitting, by the storage device, a request for a cryptographic key associated with the user and the unauthenticated input/output command, the cryptographic key being requested from a key source other than the user, the request signed with the digital signature;
receiving, from the key source to the storage device, the cryptographic key;
fulfilling, via at least one processor of the storage device, the unauthenticated input/output command in response to receiving the cryptographic key.

19. The method of claim 18, further comprising:
fulfilling the unauthenticated input/output command at least in part by appending an entry to a log of a log structured data store of the storage device.

20. The method of claim 18, further comprising:
fulfilling the unauthenticated input/output command using unencrypted data in response to determining that a user identity, corresponding to the unauthenticated input/output command, corresponds to a first identity and to encrypted data in response to determining that the user identity corresponds to a second identity.

* * * * *